Oct. 3, 1961

R. C. MITCHELL 3,002,418

DEVICE FOR USE IN THE NAVIGATION OF AIRCRAFT
BY EMPLOYING TRANSPARENCIES OF
TERRAIN FEATURES

Filed Dec. 10, 1958

INVENTOR
RAY C. MITCHELL

BY R. I. Tompkins

ATTORNEY

INVENTOR
RAY C. MITCHELL

3,002,418
DEVICE FOR USE IN THE NAVIGATION OF AIRCRAFT BY EMPLOYING TRANSPARENCIES OF TERRAIN FEATURES
Ray C. Mitchell, 212 S. Reynolds St., Alexandria, Va.
Filed Dec. 10, 1958, Ser. No. 779,506
3 Claims. (Cl. 88—1)
(Granted under Title 35, U.S. Code (1952), sec. 266)

The invention described herein may be manufactured and used by or for the Government of the United States of America for governmental purposes without the payment of any royalties thereon or therefor.

The present invention relates to aircraft navigation aids whereby low-flying, high-speed operational military aircraft may be flown on course without the necessity of the pilot's resorting to comparisons between a flight map and the terrain.

More particularly, the present invention relates to the adaption of existing cockpit equipment in military craft, such as the conventional aircraft gunsight, to enable its utilization as a navigational device by projecting on the gunfight reflector plate images of perspective profiles of salient terrain features to be encountered along the flight course.

At the present, pilots of low-level, fast-flying aircraft navigate in good weather by contact flight, that is, by looking over the side of the craft at the terrain and then looking down in the cockpit at their flight maps to make comparisons of terrain and map. It this way the aforesaid pilots determine whether or not they are "on course.." Such navigational practices divert the pilot's eyes from the "straight-ahead" view and thereby create the hazard of accident, particularly for the pilot flying at high speeds and low altitudes. Due to the high speed of modern aircraft, even in the short period of time required for the pilot to look down in his cockpit at his map there is the constant danger of collision or of running the craft into the ground before recovery can be made.

The present invention proceeds on the theory that by providing a navigational aid at the position most desired, ahead of the pilot and at eye level, this hazard can be eliminated.

Thus, one of the objects of the present invention is to provide pilots of low-level, fast-flying aircraft with a series of images of low altitude oblique views of the salient terrain features they will fly over if they remain on course, such images being superimposed on the pilot's field of vision directed ahead of the aircraft.

Another object is to provide the aforementioned navigational aid by adapting existing cockpit equipment; namely, a conventional gunsight such as the Mk 20 gunsight. In this manner there is no aggravation of the already crowded conditions in the typical fighter cockpit.

Other objects and many of the attendant advantages of this invention will be readily appreciated as the same becomes better understood by reference to the following detailed description when considered in connection with the accompanying drawings wherein.

Figure 1:
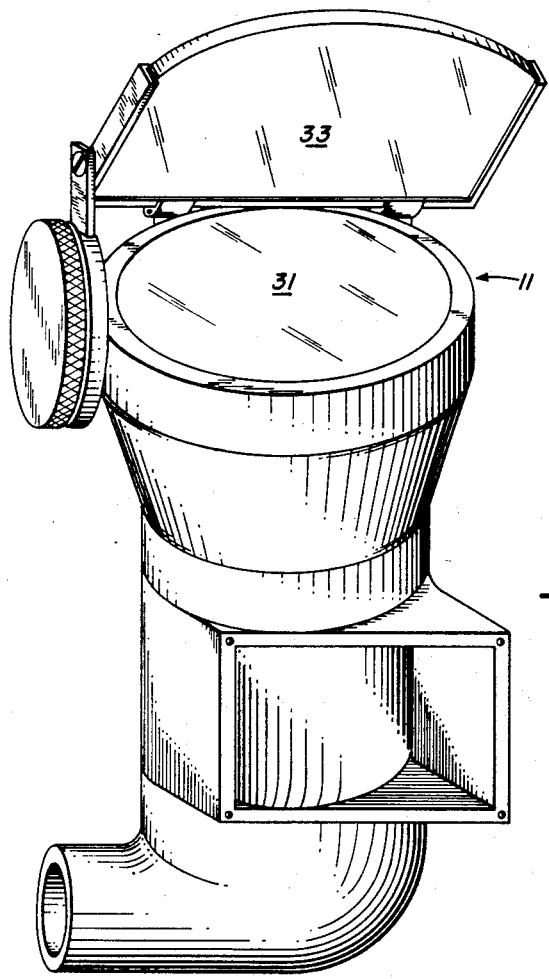
FIG. 1 is an isometric view of a typical aircraft gunsight with reticle holder removed.
Figure 2:
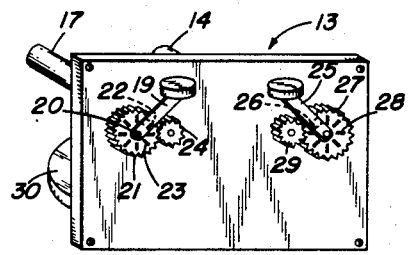
FIG. 2 is an isometric view of the mechanism for holding and advancing a strip of film.
Figure 3:
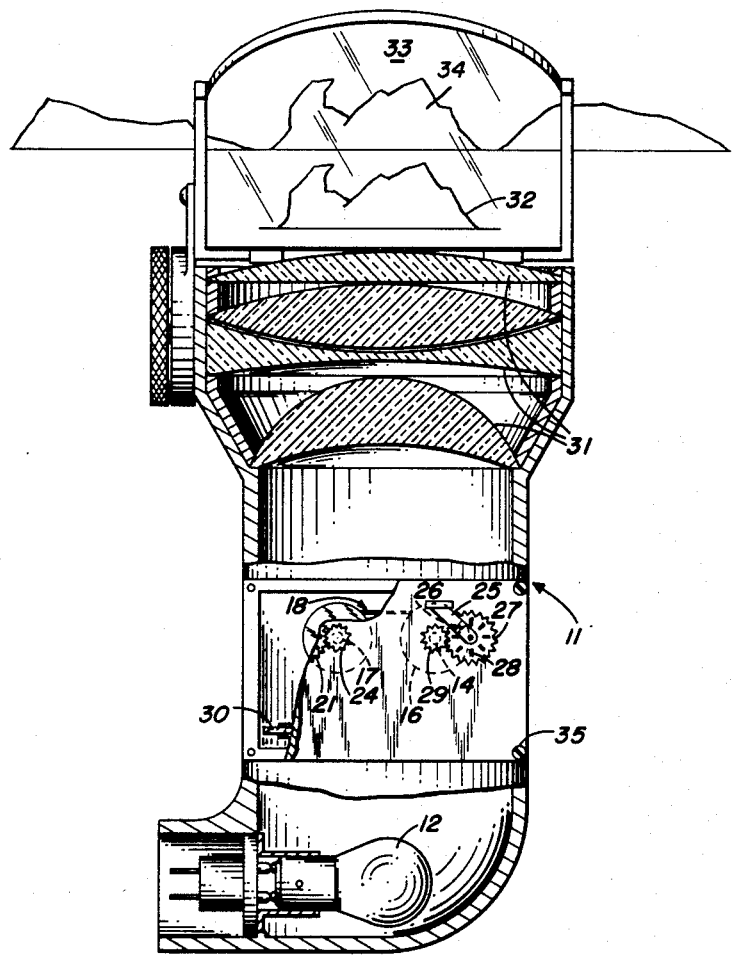
FIG. 3 is a front elevation of the assembly with a cutaway portion to show the operative arrangement of light source, film, lens system and reflector plate.

Referring to the drawing in detail, there is shown the preferred embodiment of the present invention. As indicated, a typical aircraft gunsight 11, such as the Mk-20, is readily adapted by removing the conventional reticle holder (not shown) and inserting in its place above lamp 12, the device 13 shown in FIG. 2

This device 13 employs a first spindle 14 to hold a spool of photographic film 16 composed of positive images and a second spindle 17 to which said film 18 may be advanced and stored. Lever 19 is rotatable about point 20. Ratchet gear 21 is also rotatable about point 20. Attached to lever 19 and located between lever 19 and ratchet gear 21 is pawl 22 adapted to engage holes 23 in ratchet gear 21 upon clockwise rotation only of lever 19. Thus, lever 19 and gear 21 rotate simultaneously when lever 19 is rotated in a clockwise direction but gear 21 remains stationary as lever 19 is rotated in a counterclockwise direction. Gear wheel 24 is affixed to one end of spindle 17 and is arranged to engage ratchet gear 21 and to be rotated thereby. Thus, the film 18 may be advanced from spindle 14 to spindle 17 by single frame stages.

Likewise, lever 25 with pawl 26 and ratchet gear 27 with holes 28 therein interact upon counterclockwise rotation of lever 25. Gear wheel 29 is affixed to one end of spindle 14, engages ratchet gear 27 and is rotated by the gear 27. Thus, the film 18 may be readily rewound by single frame stages from spindle 17 to spindle 14 by rotating lever 25 in a counterclockwise direction.

In the event that film 18 be of a type having low heat resistance, device 13 is provided with heat-absorbing glass 30 of optical quality mounted thereon as shown to protect film 18 from the heat of lamp 12. However, if film such as that having the trade name of Mylar is used this safeguard may be disregarded. Mylar is a film having great resistance to heat and having great durability and strength in spite of its thinness.

Separate frames of film 17 may indicate perspective profiles of salient terrain features along the pilot's flight path, may present in-flight navigational information or reminders for the pilot, such as reminders to switch to other fuel tanks or to jettison fuel tanks, and most likely may have alternate frames providing sighting reticles in the event the necessity arises to revert to using the gunsight in combat or for strafing.

Films of perspective profiles of salient terrain features should be approximately 50 miles apart and preferably should be low level oblique perspective views. Before the particular terrain feature is sighted the pilot will have flipped lever 19 to the frame of film showing this feature. Lamp 12 illuminates the film frame currently in register, light passing therethrough will be collimated by the lens system 31 and the optical image 32 of the film frame will be cast on the reflector plate 33. Reflector plate 33 is a two-way transparent reflector, thus as the pilot sights through the reflector plate 33, the image 32 is superimposed on his field of vision. By the cockpit brilliance control (not shown) the pilot can control the intensity of the image 32 whereby a desirable balance can be secured between the image and the view through the gunsight reflector plate.

If the pilot is flying on course, the salient terrain feature 34 of which the image 32 is a reproduction will, when it is sighted, be viewed through the reflector 33. If the salient terrain feature appears to the left or right, the pilot need merely alter his course to be able to view the terrain feature 34 through reflector 33.

Upon passing this terrain feature 34 the pilot depresses lever 19 as required to bring the next prespective profile of a terrain feature image (or naviagtional information) into view on reflector 33.

Mounting screws 35 are provided for quick, easy attachment of device 13 to gunsight 11.

In place of a conventional gunsight designated herein an optical instrument having the required components, light source, collimating lens system and a two-way reflector may be employed, the device 13 being arranged between the light source and the lens system. Such an optical instrument should, of course, be placed in the line of sight of the pilot to permit a simultaneous view of the terrain ahead of the aircraft and the image of the perspective profile of the terrain features chosen as "guideposts" along the flight path. Thus, although the present invention is intended for operational use in military aircraft, that is in flights over terrain with which the pilot is unfamiliar, its use is not limited to military flight navigation.

Obviously many modifications and variations of the present invention are possible in the light of the above teachings. It is therefore to be understood that within the scope of the appended claims the invention may be practiced otherwise than as specifically described.

What is claimed is:

1. A device for use in the navigation of an aircraft comprising in combination, a frame mounted within the aircraft, a light source mounted within said frame, a collimating lens system mounted within the frame and disposed above said light source for forming optical images, a support secured to the frame and disposed between said light source and the lense system, a photographic film carried on said support for advancement selectively in either of two directions, said film being provided with a series of positive images having different perspective profile terrain characteristics corresponding to actual terrain characteristics encountered along the proposed flight path, spindle means rotatably mounted on said support and supporting said film for lateral movement between said light source and the lens system, a first gear means rotatably mounted on said support for rotation in either of said two directions, lever means pivotally mounted on said support, actuating means pivotally mounted on said lever means engageable with said first gear means for selectively rotating the first gear means step by step in either of said two directions, a second gear means carried by said spindle means and controlled by said first gear means for rotating the spindle means step by step to advance the film in accordance with the direction of rotation of the first gear means to expose said positive images at predetermined spaced intervals so that the light passes therethrough and through the lens system, and a transparent mirror carried by the frame and disposed above the lens system, film and the light source for superimposing the optical images of the positive images upon the mirror and normal to the forward line of vision of the pilot through the mirror so that the actual terrain characteristics visable therethrough and the optical images superimposed thereon coincide and are disposed in juxtaposition with respect to each other.

2. A device for use in the navigation of aircraft comprising in combination a tubular member mounted within the aircraft in the normal forward line of vision of the pilot of the aircraft, a light source mounted within said tubular member, a collimating lens system mounted within said tubular member above said light source, a support secured to said tubular member and disposed between said light source and the collimating lens system, a photographic film carried on said support and advanceable laterally in either direction, said film having a series of positive images simulating terrain features of different perspective profiles and corresponding to the actual terrain encountered along a proposed path of flight of the aircraft, a first spindle rotatably mounted on said support, a second spindle rotatably mounted on said support and in spaced relationship with respect to said first spindle, a first driving gear rotatably mounted on said support, a first lever pivotally mounted on said support, first actuating means carried by said first lever for advancing said first driving gear step by step in one direction, a first gear wheel carried by the first spindle and advanced step by step by said first driving gear so as to advance the film from the first spindle to said second spindle to expose said positive images at predetermined spaced intervals so that the light from said light source will pass therethrough and through said lens system, and a transparent mirror carried by said tubular member and disposed above said lens system and the film for superimposing the optical images of the positive images at predetermined spaced intervals upon the mirror and normal to the forward line of vision of the pilot through said transparent mirror so that the actual terrain features visable therethrough and the optical images superimposed thereon are identical and disposed in juxtaposition with respect to each other.

3. The combination according to claim 2 including a second driving gear rotatably mounted on said support, a second lever pivotally mounted on said support, second actuating means carried by said second lever for advancing said second driving gear step by step in the other direction, a second gear wheel carried by the second spindle and advanced step by step by said second driving gear so as to rewind the film from the second spindle to said first spindle.

References Cited in the file of this patent

UNITED STATES PATENTS

| | | |
|---|---|---|
| 2,379,167 | Lynn | June 26, 1945 |
| 2,814,199 | Waldorf et al. | Nov. 26, 1957 |
| 2,887,927 | Newton | May 26, 1959 |
| 2,949,808 | Thurow | Aug. 23, 1960 |
| 2,960,906 | Fogel | Nov. 22, 1960 |